US007784639B2

(12) United States Patent
Milkowski et al.

(10) Patent No.: US 7,784,639 B2
(45) Date of Patent: Aug. 31, 2010

(54) PREFORM OF A PLASTIC CONTAINER PARTICULARLY DESIGNED FOR PACKAGING FOODSTUFFS

(75) Inventors: Bogumil Milkowski, Gdańsk (PL); Dariusz Lewandowski, Warsaw (PL); Andrzej Toborowicza, Warsaw (PL)

(73) Assignee: Invento Spolka ZO.O, Warszawa (PL)

( * ) Notice: Subject to any disclaimer, the term of this patent is extended or adjusted under 35 U.S.C. 154(b) by 1017 days.

(21) Appl. No.: 10/580,073

(22) PCT Filed: Nov. 19, 2004

(86) PCT No.: PCT/PL2004/000092

§ 371 (c)(1),
(2), (4) Date: May 19, 2006

(87) PCT Pub. No.: WO2005/049434

PCT Pub. Date: Jun. 2, 2005

(65) Prior Publication Data

US 2007/0090118 A1    Apr. 26, 2007

(30) Foreign Application Priority Data

Nov. 20, 2003    (PL) ......................... 363595

(51) Int. Cl.
*B65D 1/42* (2006.01)
*B29D 22/00* (2006.01)

(52) U.S. Cl. ..................... 220/657; 428/35.7

(58) Field of Classification Search .......... 220/657, 220/659, 656, 608, 675, 669, 660; 215/382, 215/371, 370, 379; 428/548.2, 35.7, 34.1; D9/571, 567, 562, 554, 549, 516
See application file for complete search history.

(56) References Cited

U.S. PATENT DOCUMENTS

| 648,436   | A | * | 5/1900  | Rider ........................ 215/377 |
| 2,614,727 | A | * | 10/1952 | Robinson ................... 220/780 |
| 3,027,044 | A | * | 3/1962  | Winstead ................... 220/604 |
| 3,190,530 | A | * | 6/1965  | Edwards .................... 229/400 |
| 3,705,660 | A | * | 12/1972 | Bright ........................ 215/372 |
| 3,785,311 | A | * | 1/1974  | Yoshikawa .................. 72/348 |
| 3,984,259 | A | * | 10/1976 | Rogers et al. ............... 148/690 |
| 4,420,081 | A | * | 12/1983 | Dart ........................... 206/519 |

(Continued)

FOREIGN PATENT DOCUMENTS

EP    0482652    4/1992

(Continued)

*Primary Examiner*—Anthony Stashick
*Assistant Examiner*—Robert J Hicks
(74) *Attorney, Agent, or Firm*—Katten Muchin Rosenman LLP

(57) ABSTRACT

This invention relates to the preform to produce a plastic container for packaging foodstuffs, and especially to blow mould thin-walled containers which can be hermetically closed with a metal lid by double seaming. The preform (1) includes a body (4) and a convex hemispherical bottom (6). The body (4) has a conical shape that flares towards a cylindrical neck (2) surrounded by a flange (3) that terminates in a thickened rim (5). Preferably, the angle ($\alpha$) at which the internal body surface (4) flares towards the cylindrical neck is greater than the angle ($\beta$) at which the external body surface (4) opens upwards, and the thickness (g2) of the cylindrical neck (2) is less than the thickness (g3) of the bottom (6).

8 Claims, 2 Drawing Sheets

U.S. PATENT DOCUMENTS

| | | | |
|---|---|---|---|
| 4,496,064 A * | 1/1985 | Beck et al. | 215/43 |
| 4,751,035 A | 6/1988 | McHenry et al. | |
| 4,950,514 A * | 8/1990 | Strassheimer | 428/36.92 |
| 5,342,663 A * | 8/1994 | Yokobayashi | 428/35.7 |
| 5,575,398 A * | 11/1996 | Robbins, III | 220/8 |
| 5,833,085 A | 11/1998 | Valyi et al. | |
| 6,260,723 B1 * | 7/2001 | Bergholtz | 215/344 |
| 6,413,467 B1 * | 7/2002 | Britton | 264/537 |
| 2002/0125260 A1 * | 9/2002 | Nakamura et al. | 220/669 |
| 2004/0065669 A1 * | 4/2004 | Giraud et al. | 220/839 |
| 2004/0137178 A1 * | 7/2004 | Janusson et al. | 428/35.7 |
| 2006/0073296 A1 * | 4/2006 | Nahill et al. | 428/35.7 |

FOREIGN PATENT DOCUMENTS

| | | |
|---|---|---|
| EP | 0378456 | 2/2000 |
| EP | 0978456 | 2/2000 |
| FR | 2599002 A1 * | 11/1987 |
| JP | 62018215 A * | 1/1987 |
| JP | 05032247 A * | 2/1993 |
| MA | 28420 | 2/2007 |
| PL | 193908 B1 * | 5/2000 |
| WO | 8301766 | 5/1983 |
| WO | WO8301766 | 5/1983 |
| ZA | 20064995 | 11/2007 |

* cited by examiner

PREFORM OF A PLASTIC CONTAINER PARTICULARLY DESIGNED FOR PACKAGING FOODSTUFFS

THE FIELD OF THE INVENTION

This invention relates to the preform of a plastic container particularly designed for packaging foodstuffs. This preform is formed using the conventional injection moulding machinery and utilised to form plastic containers, such as cans, for packaging foodstuffs, and especially to blow mould thin-walled containers which can be hermetically closed with a metal lid secured to the container by seaming the lid flange on filling machines, without deforming the flange or the cylindrical neck under it.

THE STATE OF ART

The Polish patent application no. P 336 680 A1 relates to a plastic preform designed for forming thin-walled containers. The preform has a threaded neck and a cylindrical body terminated with a convex hemispherical bottom. The body diameter of this preform is 0.5 to 0.85, and the body wall thickness is 0.08 to 0.18, of the neck diameter.

It has been known for some time how to form thin-walled containers terminated with a flange by blow moulding the conventional preform and then severing the top portion of the container including a threaded neck. In this way immense amounts of scrap are produced, which the result that the whole process is highly uneconomical. Furthermore, this method leaves much uncertainty about the reliability of the closure, including its tightness and resistance to pressures inside the container. The edge of the container flange may become nicked by cutting operations and its thickness may vary along the circumference, which is normal as the flange is blow moulded as a part of the side wall of a larger container.

In order for the closure of the plastic container to be tight under pressure, it would be best if the container was formed from the injection moulded preform by a stretch blow moulding process.

Patent EP 0482652B1 describes a cylindrical preform with a flat bottom, wherein the bottom is much thinner than the preform walls that gradually slightly part. Due to the fact that the flow of material is hindered, it is impossible to achieve the flange thickness that is below 0.3 mm. The preform flange is smooth and does not have a thickened rim.

Patent WO-A 83/01766 presents a preform, which is generally cylindrical in shape and slightly tapers in the downward direction; its walls and bottom have the same thickness. The flange is smooth and does not have a thickened rim. It has been noted in the document that it is impossible for one to achieve a good degree of orientation of the material in the flange of such a preform; hence, its strength is insufficient for good quality connection between the metal lid and the container.

The optimum solution for the cylindrical neck and the flange is to come as closely as possible to the dimensions of a metal container, while maintaining the best possible strength parameters. In this way, the container formed from the preform by a stretch blow moulding process could be efficiently closed by seaming a metal lid, thereby providing a reliable closure for carbonated beverages under pressure. This invention brings us closer to solving this problem.

THE SUMMARY OF THE INVENTION

The subject preform for forming plastic containers has a conical shape with a convex hemispherical bottom. The body of the preform flares towards a cylindrical neck surrounded by a radially outwardly extended flange terminated in a thickened rim. The opening angle of the internal conical surface of the body is greater than the opening angle of the external conical surface of the body; hence, the bottom is the thickest part of the container body and the cylindrical neck is significantly thinner than the bottom. The inflow of the material to the neck space and then to the flange is easy. This is due to the fact that the bottom at the injection point is relatively thick, the walls are appropriately inclined and their thickness tapers in a favourable manner. The material flow velocity in the mould is relatively high during the forming process with the result that the time taken by the material to reach the preform peripheries, including the flange, is short and a decline in temperature of the flowing material is much lower, which allows for appropriate filling and orientation and ensures a far better flange strength. In this way, it is possible for the flange thickness to be less than 0.3 mm, which is required for good quality seaming of the metal lid. The best seaming quality is achieved when there is a gradual change in thickness between the cylindrical neck and the flange and the transition between these two elements is arched.

Preferably, the ratio of the flange thickness to the cylindrical neck thickness should be approximately 0.8.

Furthermore, in order to ensure that the container metal lid fits precisely into the flange rim, it is desirable that the angle between the flange and the cylindrical neck is $180°-\gamma$, where $\gamma$ lies within a range of $60°$ to $90°$, and most preferably equals $78°$.

In order for the seaming operation to ensure a good quality connection between the pressure container and the metal lid, the flange should terminate in a thickened annular rim showing on one or both sides of the flange ending. The height of the annular thickened rim should vary from 1.1 to 2.0 times the flange thickness.

The flange in the axial sectional view may also have a rectangular rim whose height is generally equal to the flange thickness. Such flanges can be used in containers where there is no internal pressure involved. In such a case, the angle $\gamma$ is preferably $90°$.

THE BRIEF DESCRIPTION OF THE DRAWINGS

The present invention has been described in greater detail in the figures below. We believe that these figures illustrate the most efficient version of the preform.

THE MOST EFFICIENT VERSION

Figure 1:
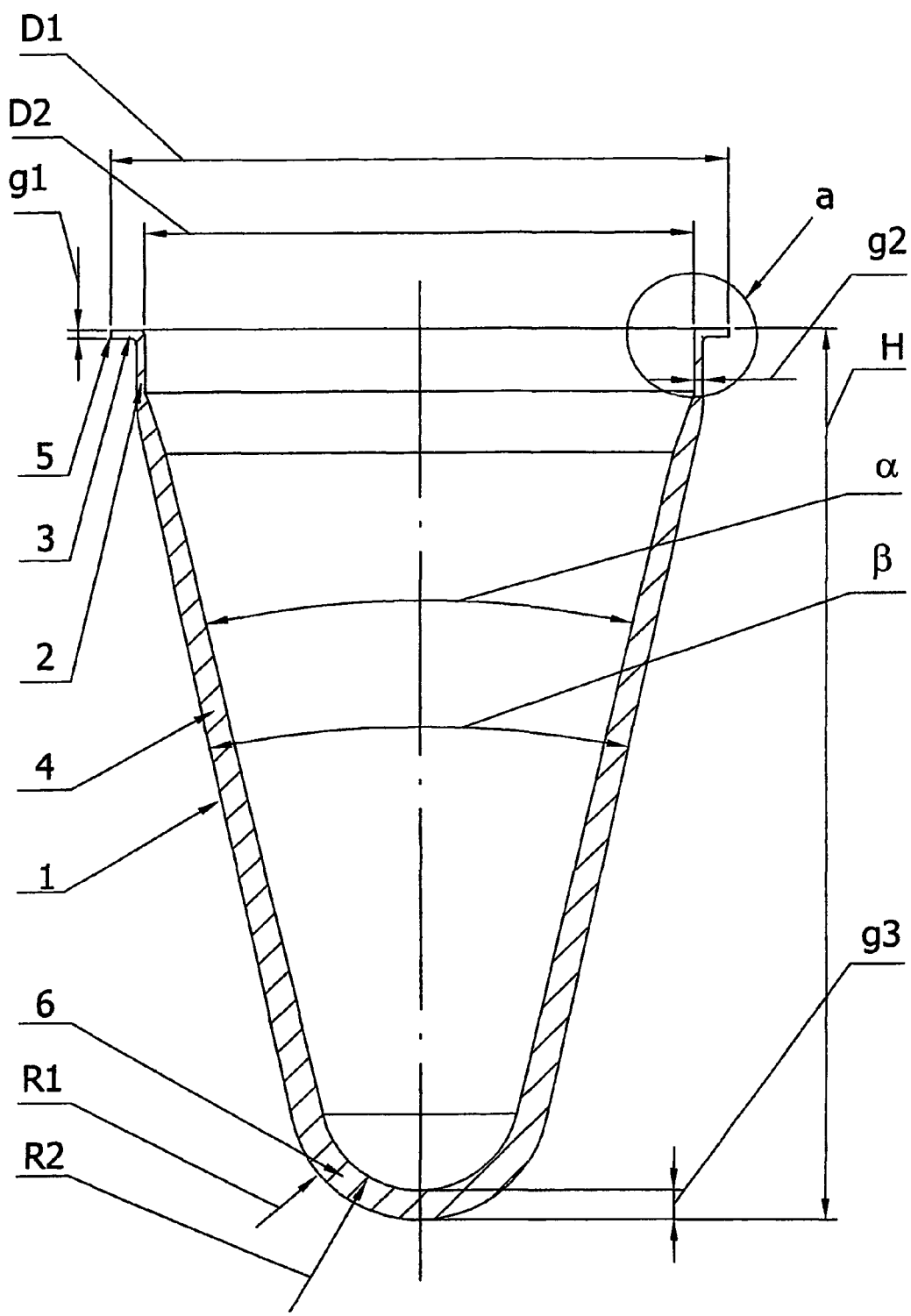
FIG. 1 shows an axial sectional view of the preform.

As shown in FIG. 1, the preform 1 of a plastic container particularly designed for packaging foodstuffs, includes a body 4 with a convex hemispherical bottom 6. The body 4 has a conical shape that opens upwards and ends with a cylindrical neck 2 surrounded by a radially outwardly extended flange 3 terminated in a thickened rim 5. The angle $\alpha$ at which the internal body surface 4 opens upwards is greater than the angle $\beta$ at which the external body surface 4 opens upwards.

In the axial sectional view, the internal radius R2 of the bottom 6 of the body 4 is less than the corresponding external radius R1. The thickness of the body 4 decreases gradually starting from the bottom 6; therefore, the thickness g2 of the cylindrical neck 2 is significantly less than the thickness g3 of the bottom 6. The flange thickness g1 is less than 0.3 mm.

Figure 2:
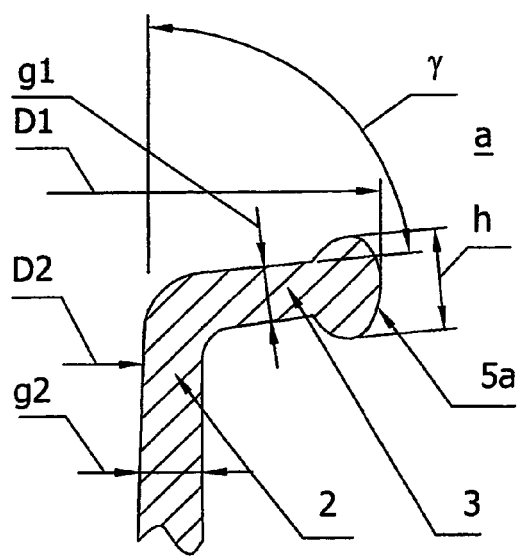
FIG. 2 shows an enlarged picture of the preform flange with a double-sided annular thickened rim.

FIG. 2 shows an enlarged rim 5 of the flange 3 of the preform 1 which is deviated from the cylindrical neck at an angle of 180°-γ, where γ lies within a range of 60° to 90°. The flange 3 terminates in an annular thickened rim 5a on both its sides. The height h of the thickened rim 5a varies from 1.1 to 2.0 times the flange thickness g1.

Figure 3:
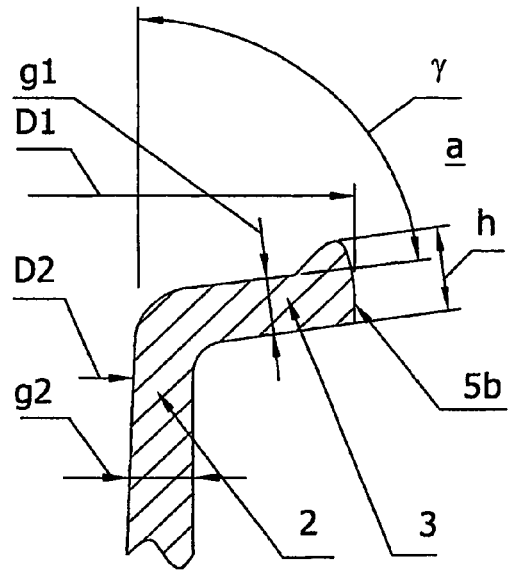
FIG. 3 shows an enlarged picture of the preform flange with a one-sided annular thickened rim on top of the flange.

FIG. 3 shows an enlarged rim 5 of the flange 3 of the preform 1 which is deviated from the cylindrical neck at an angle of 180°-γ, where γ lies within a range of 60° to 90°. The flange 3 terminates in a one-sided annular thickened rim 5b on the top of it. The height h of the thickened rim 5b varies from 1.1 to 2.0 times the flange thickness g1.

Figure 4:
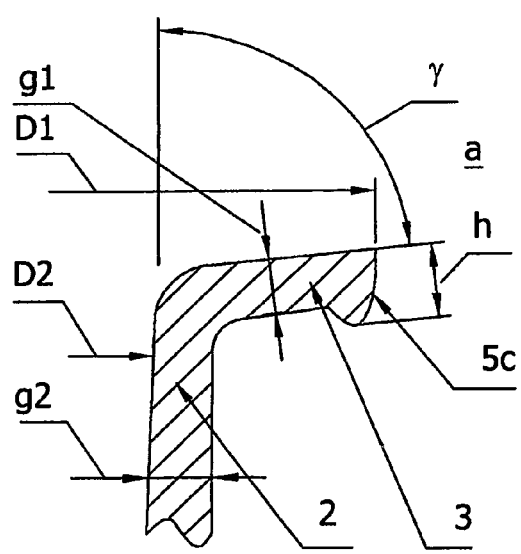
FIG. 4 shows an enlarged picture of the preform flange with a one-sided annular thickened flange rim underneath the flange.

FIG. 4 shows an enlarged rim 5 of the flange 3 of the preform 1 which is deviated from the cylindrical neck at an angle of 180°-γ, where γ lies within a range of 60° to 90°. The flange 3 terminates in a one-sided annular thickened rim 5c underneath it. The height h of the thickened rim 5c varies from 1.1 to 2.0 times the flange thickness g1.

Figure 5:
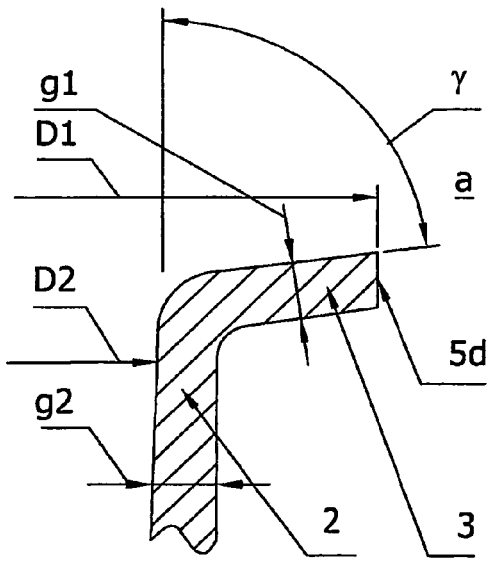
FIG. 5 shows an enlarged picture of the preform flange with rectangular flange rim.

FIG. 5 shows an enlarged rim 5 of the flange 3 of the preform 1 which is deviated from the cylindrical neck at an angle of 180°-γ, where γ lies within a range of 60° to 90°. The flange 3 terminates in a rectangular rim 5d whose height h is generally equal to the flange thickness g1.

The preform 1 as shown in FIG. 1 with external diameter D1 and height H is made of polyethylene (PET), a thermoplastic material specifically designed for packaging foodstuffs. When using the subject preform to blow mould a thin-walled container, the diameters D1 and D2 of the cylindrical neck 2 and the flange 3 do not change. A relatively small flange thickness allows for a better fit of the metal lid at the first stage of the double seaming process. The thickening of the flange rim facilitates the holding of the preform during the blow moulding operation and allows for further tightening of the metal lid against the pressure container body at the second stage of the double seaming process.

The invention claimed is:

1. A preform of a plastic container, comprising:
    a conically-shaped container comprising a body having an inner wall and an outer wall defining a predetermined wall thickness, said body having a bottom portion and a top portion, wherein the container body flares continuously outward from the bottom portion to the top portion,
    wherein the degree in which the inner wall flares continuously outward is greater than the degree in which the outer wall flares continuously outward, resulting in a wall thickness that gradually decreases starting from the bottom portion to the top portion;
    said bottom portion comprising a convex hemispherical shape; and
    said top portion comprising a cylindrical neck that includes a flange terminated in a thickened rim.

2. The preform according to claim 1, wherein the flange comprises a flange end having a thickness less than 0.3 mm and wherein the flange has a wall thickness that is less than or equal to a cylindrical neck wall thickness.

3. The preform according to claim 2, wherein the thickness of the flange is less than 0.30 mm.

4. The preform according to claim 1, wherein a rim of the flange has an annular thickness whose height is between 1.1 to 2.0 times a flange thickness.

5. The preform according to claim 1, wherein a rim of the flange has a thickening radially extending from the top of the rim whose height is between 1.1 to 2.0 times a flange thickness.

6. The preform according to claim 1, wherein a rim of the flange has a thickening radially extending underneath the rim whose height is between 1.1 to 2.0 times a flange thickness.

7. The preform according to claim 1, wherein the container body is made from a plastic material.

8. The preform according to claim 7, wherein the plastic material is polyethylene terephthalate.

* * * * *